3,473,295
PARTITION FORMING AND INSERTING
APPARATUS
Biagio J. Nigrelli, Northbrook, Wendell E. Standley, Lake Forest, and Richard B. Wittmann, Chicago, Ill., assignors to Container Corporation of America, Chicago, Ill., a corporation of Delaware
Filed Aug. 30, 1967, Ser. No. 664,351
Int. Cl. B65b 65/00
U.S. Cl. 53—393          10 Claims

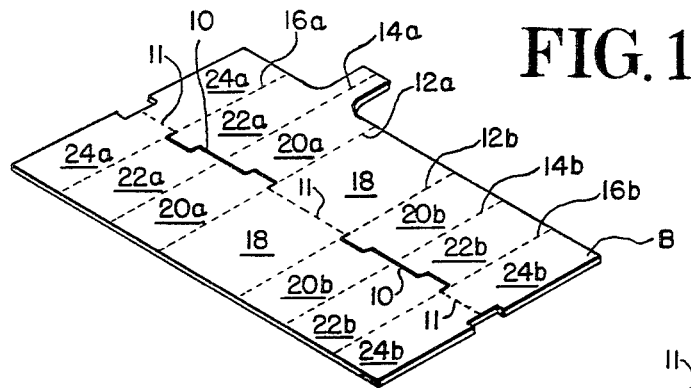

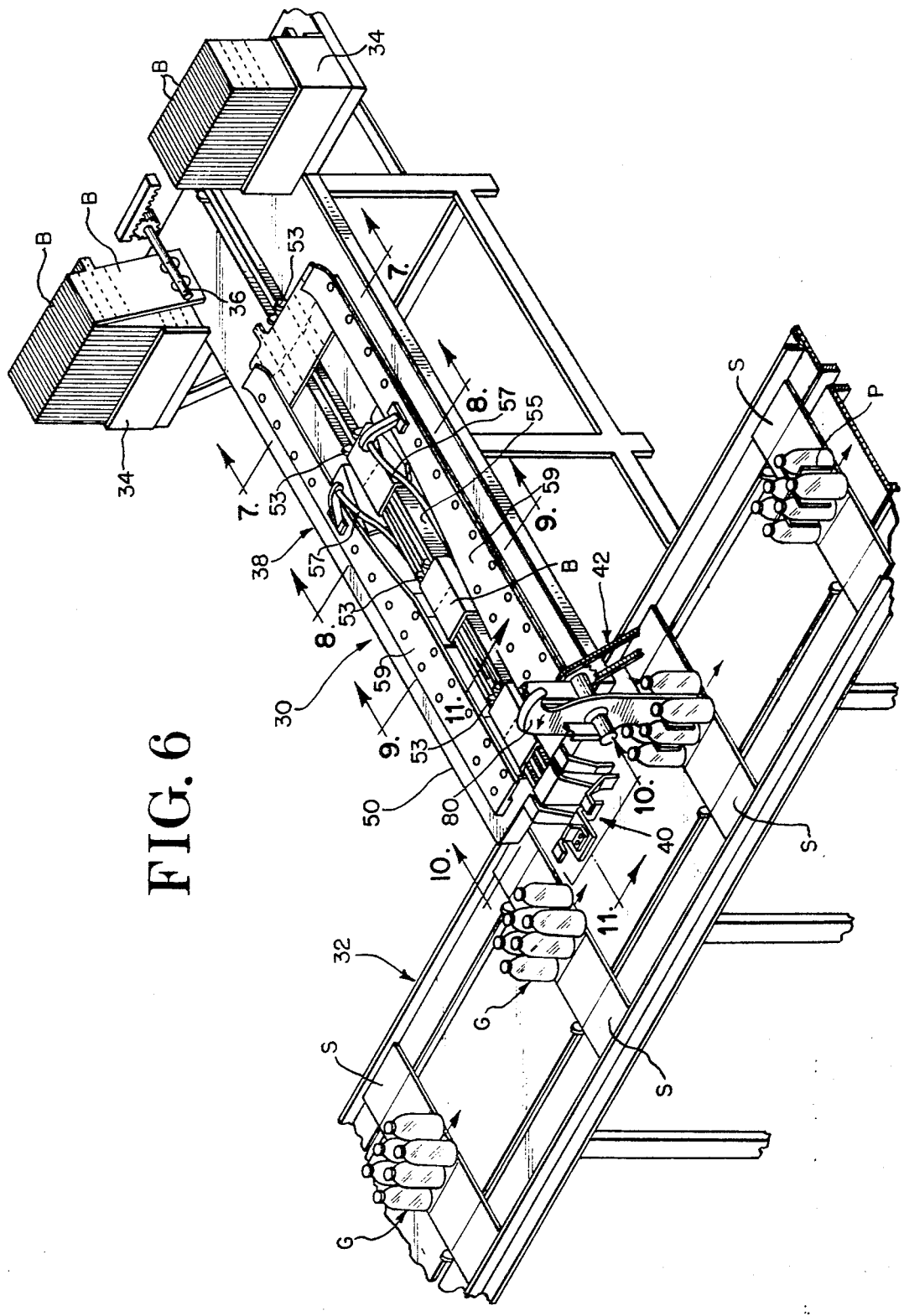

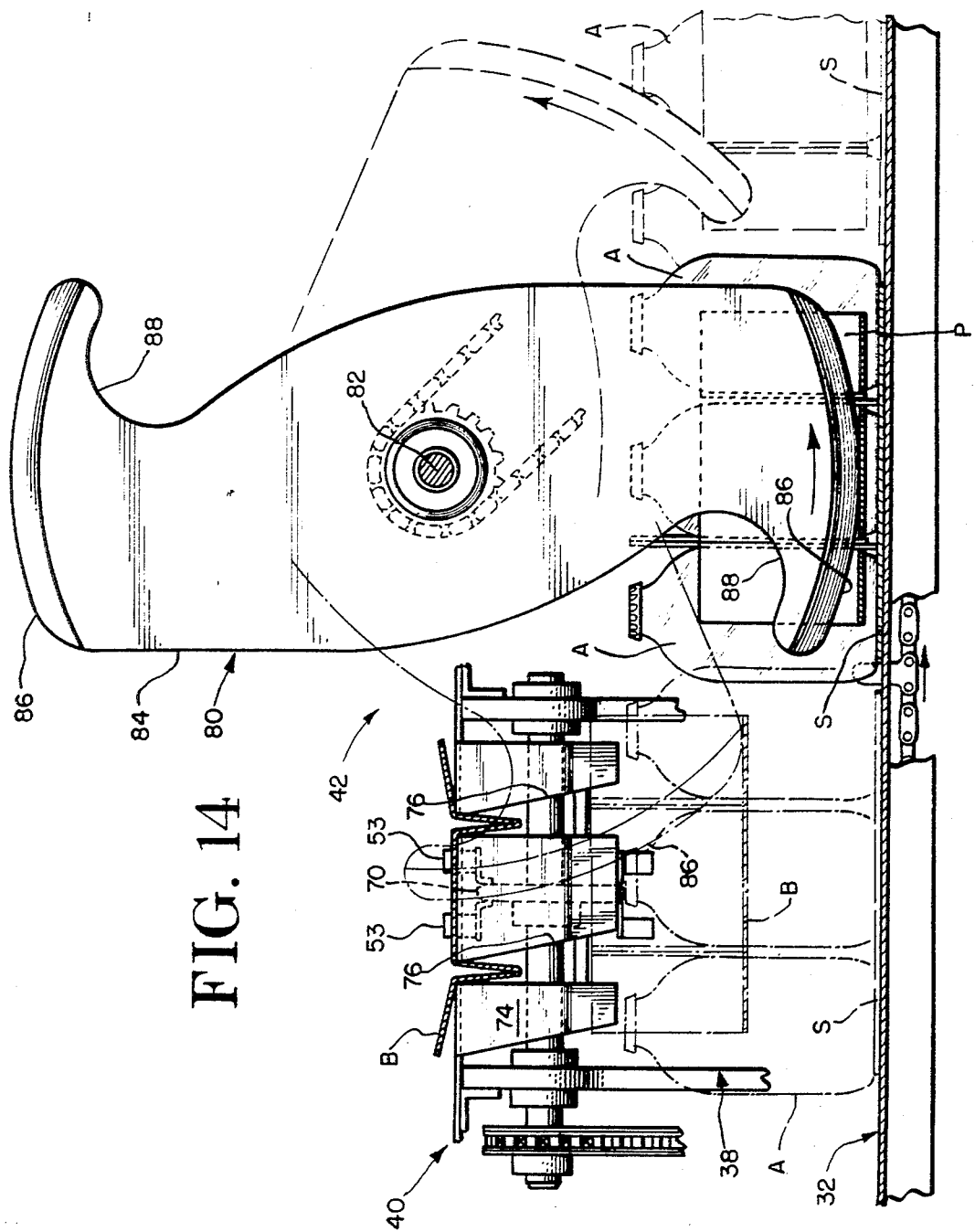

ABSTRACT OF THE DISCLOSURE

Apparatus for folding and inserting a partition into a moving group of articles, the apparatus including structure for partially folding a die-cut partition blank to a predetermined configuration and thereafter having a blade element continuously rotating to move in line with the moving group of articles for further folding the partition blank and simultaneously forcing it into a group of articles.

---

This invention relates to a machine for folding and inserting a partition into a group of articles that is moving uniformly and continuously along a particular path.

Modern packaging of fragile articles, such as glass bottles, provides for separating adjacent articles by means of a partition insert. In packaging of glass, it is desirable to have the articles move continuously, as distinguished from successively stopping and starting. One existing problem has been the successful insertion of a partition into the moving group of articles, without varying the advance of the article group.

Accordingly, an object of this invention is to provide apparatus for folding and inserting a partition into a moving group of articles so that the speed of the article need not be varied but can be maintained constant.

Another object of this invention is to provide apparatus having a continuously rotating contoured blade which is used for engaging and simultaneously folding and inserting a partition into a group of articles that is advancing beneath the blade.

Another object of this invention is to provide apparatus for inserting a partition into a continuously moving group of articles so that the partition is moved downwardly into the article group and simultaneously forwardly with the article group.

These and other objects will be more fully understood after reviewing the subject specification including the accompanying drawings, wherein:

FIG. 1 is a perspective view of a die-cut blank for a partition which is suitable for use with the subject apparatus to be discussed hereinafter;

FIG. 2 is a perspective view of the same blank, except showing it in a partially folded manner;

FIG. 3 is a perspective view of a group of articles suitable for use with the partition disclosed in FIGS. 1 and 2, showing the partition as it is partially inserted into the article group;

FIG. 4 is a top plan view of the article group, showing the partition positioned within the group;

FIG. 5 is a sectional view as seen generally from lines 5—5 of FIG. 4 of the article group, showing also a typical wrap-around sleeve type carrier holding the group together;

FIG. 6 is a perspective view of the subject apparatus which will be disclosed herein;

Figure 7:
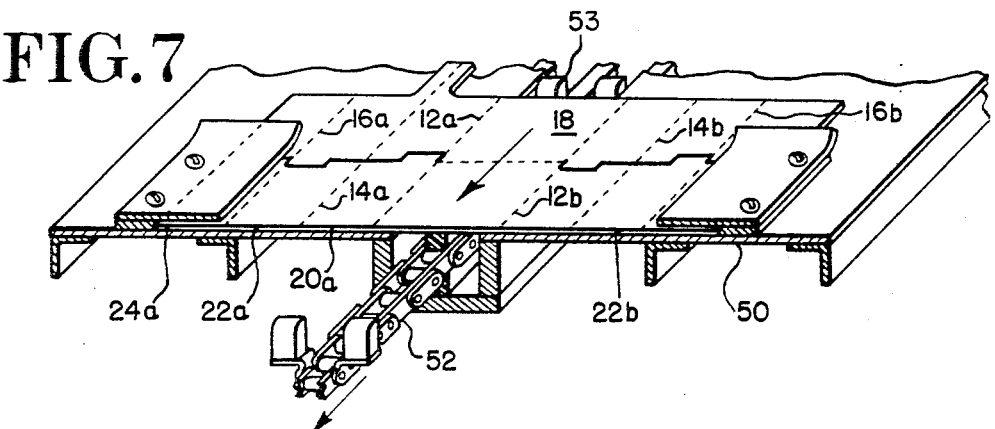
Figure 8:
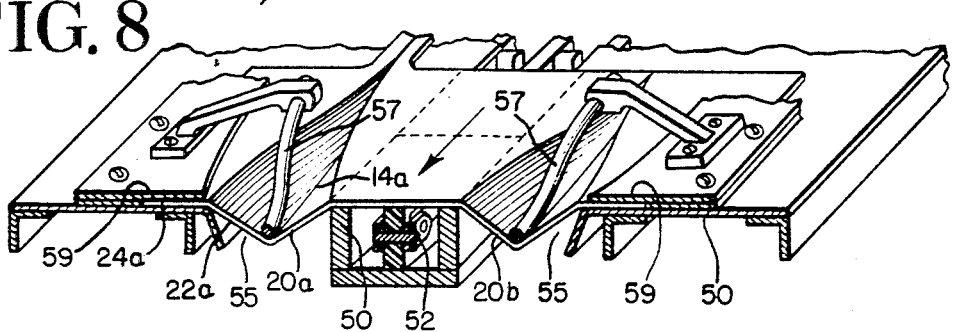
Figure 9:
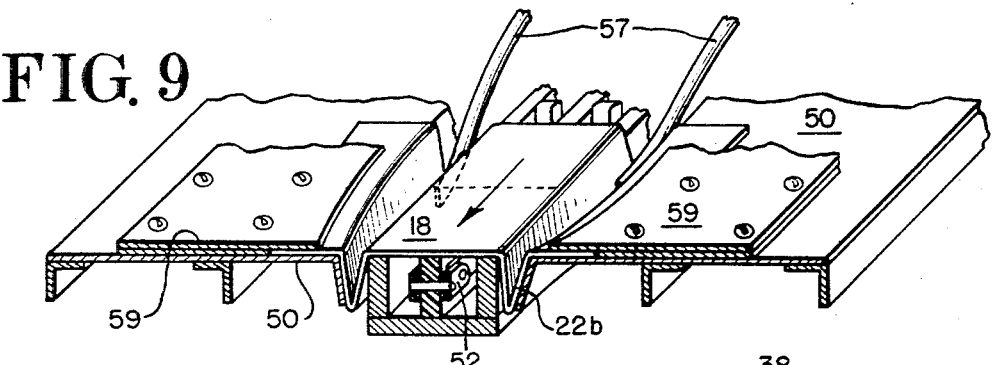
Figure 10:
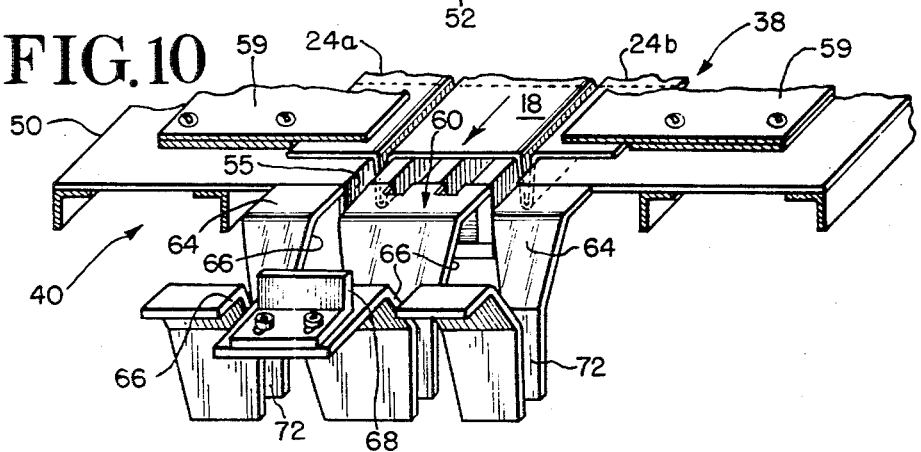
Figure 11:
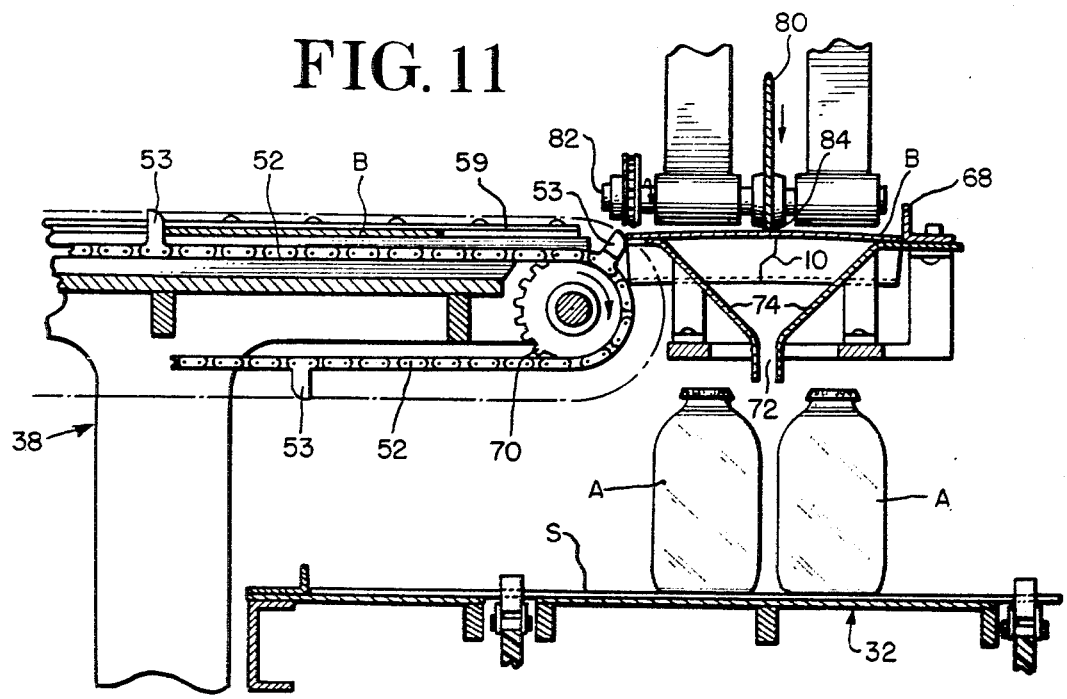
Figure 12:
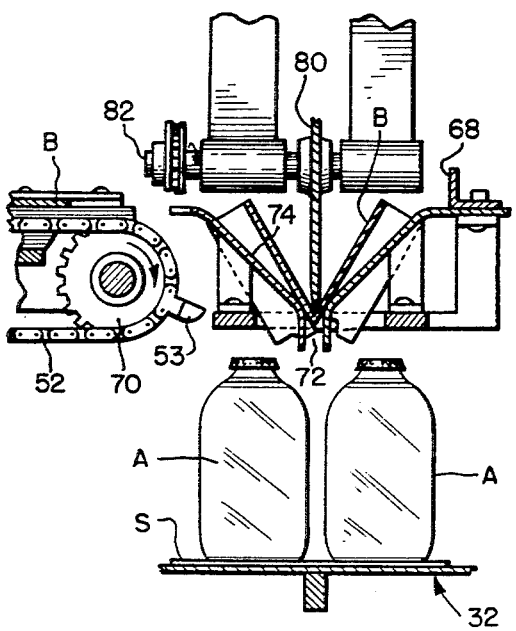
Figure 13:
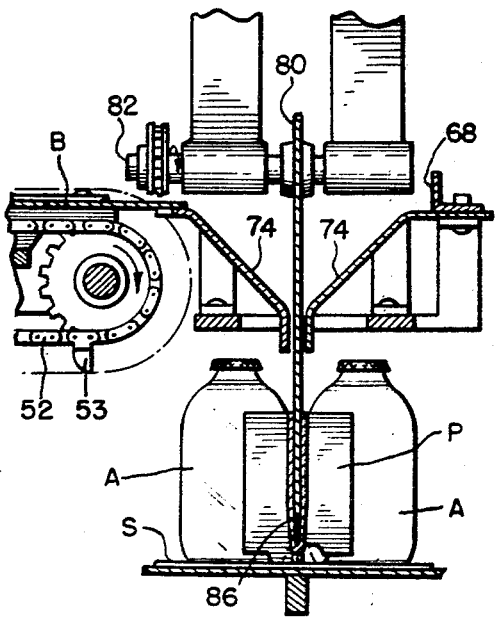

FIGS. 7, 8, 9 and 10 are perspective views as seen generally from lines 7—7, 8—8, 9—9 and 10—10, respectively, of FIG. 6 and showing the particular mechanisms of the apparatus;

FIG. 11 is a section view as seen generally from lines 11—11 in FIG. 6;

FIGS. 12 and 13 are views similar to FIG. 11, except showing the mechanism in various stages of operation; and FIG. 14 is an end elevational view of the apparatus.

In order to understand the subject apparatus, the particular partition and article group into which the partition is to be inserted will be described initially. FIGS. 1–5 show a partition blank B and an article group G. The blank B is generally an elongated section of paperboard that is divided generally along its medial section by aligned cut lines 10 and score lines 11. The blank further is divided by means of fold lines normal to lines 10 and 11 into a plurality of individual panels, the fold lines being generally symmetrically disposed relative to the transverse center of the blank and being identified specifically as lines 12a and 12b, 14a and 14b, and 16a and 16b. Panels thereby are defined between the various fold and/or cut lines and include central panels 18, transverse V-forming partition panels 20 (a and b) and 22 (a and b), and longitudinal partition end panels 24a and 24b. The various V-forming and end panels are similar to one another and are also generally symmetrical of the central panel 18.

The blank is initially folded in an accordion-type fashion (FIG. 2) with the partition panels 20 and 22 being V-folded into back-to-back relationship and at almost right angles to the central and end panels. Thereafter, the blank is folded about the medial fold lines 11 between the central and end panels to bring said panels into back-to-back relationship. The folded partition P (FIG. 3) thus has a main or longitudinal body section formed by the central panels 18 and end panels 24 folded in back-to-back relationship, and cross or transverse sections located medially of the longitudinal section and formed by the V-forming transverse partition panels 20 and 22 folded in back-to-back relationship. Each of the sections is double ply and, therefore, can be advantageously formed with relatively low caliber board and yet satisfy the transport carrier Rule 41 regarding packaging of bottles.

The group G is composed of two rows of articles A, and each row is shown comprised of three articles to illustrate a conventional "six-pack" configuration. The articles A are preferably separated from one another a sufficient distance to permit the insertion of the partition P without undue interference. As illustrated, the group G is conveyed in the direction indicated by the arrow 25 and the partition P is inserted into the group in a downwardly and downstream direction as indicated by the arrow 27.

The relationship of the partition P to the articles of the group G is shown in FIG. 4, and each of the partition P extends between the adjacent articles at least to the tangent points thereof. Conventionally, the group of articles is held together by means of a paperboard sleeve in the form of a carrier C (FIG. 5). The carrier C shown is of a simple sleeve construction and includes an elongated sheet S of paperboard folded about the group of articles and secured together at its ends as a lapped joint 28.

FIG. 6 shows a perspective view of the subject folding and inserting apparatus. The apparatus 30 is shown located adjacent a typical conveyor 32 suitable for conveying successive groups of articles, which are typically located on a flat carrier blank S. The blank S is thereafter folded about the group of articles and secured as shown in FIG. 5 by conventional means not illustrated.

The folding and inserting apparatus 30 is seen to include hoppers 34 for holding a plurality of the partition blanks B. Suitable blank handling means 36 withdraws each blank from the hopper 34 and deposits it flatwise onto the blank conveyor 38 adapted to move the blank toward the article conveyor 32. While the blank is conveyed along the blank conveyor 38, it is folded to the configuration shown in FIG. 2 and is deposited in this configuration onto a blank saddle means 40 located over the article conveyor 32. The blank saddle means includes a plurality of supports for maintaining the prefolded blank in this prefolded configuration, the supports being separated from one another so that the partition can be pushed past them and into the bottle group passing therebeneath. Partition inserting means 42 is located above the article conveyor 32 downstream (relative to the travel of the article conveyor) from the blank saddle means 40 and is synchronized to the passage of a group of articles beneath the saddle means to fold the blank to the configuration shown in FIG. 4 and simultaneously force it into the group of articles.

The entire operation basically described thus far is fully automatic and continuous to permit a completely mechanized line to operate successfully. The partition inserting means forces the partition from the blank saddle means smoothly into the group of articles and does so without interrupting the uniform advance of the group of articles on the article conveyor.

Referring now to FIGS. 7–10, a more detailed description of the blank conveyor 38 will be given. The blank conveyor consists of a dead plate 50 upon which the partition blank can be deposited flatwise, and a moving chain element 52 operating beneath the dead plate and including a pusher 53 to engage the rear side of the blank for advancing the blank toward the blank saddle means 40. The blank is deposited on the blank conveyor 38 so that it travels in a direction parallel to the various fold lines 12, 14 and 16 on the blank. The dead plate 50 is provided with voids or openings 55 (FIGS. 8 and 9) extending longitudinally of the length of the blank conveyor that are located beneath the transverse V-forming partition panels 20 and 22 of the blank. Folding means are supported above the voids 50 and include elongated narrow plows 57 adapted to engage the blank generally along the fold lines 14 between the adjacent V-forming panels and force the V-forming panels beneath the end and central panels. The end panels of the blank are received beneath guides 59 and are held thereby generally parallel to the central panel as the partition is folded by the plows 57.

The blank saddle means 40 is located in alignment with the blank conveyor 38 and includes central supports 60 in line with the central panel 18 of the blank, and end supports 64 in line, respectively, with the end panels 24 of the blank. The various central and end supports 60 and 64, respectively, are spaced from one another by transverse openings 66 in line with the voids 55 in the blank conveyor and operate thereby to receive the transverse V-forming panels 22 and 24 of the partition. A stop 68 on the blank saddle 40 locates the blank properly on the saddle, and the conveyor chain 52 passes around end sprocket 70 (FIG. 11) so that the pusher 53 just clears the blank when the blank contacts the stop 68.

The blank saddle support 40 further is provided with longitudinal openings 72 in vertical alignment over and located between the two rows of articles in the article group. The saddle supports include longitudinal surfaces 74 which converge downwardly to the longitudinal opening 72 at approximately 45° angles to assist the final folding of the partition blank (FIG. 12, for example) before it is inserted into the article group. The downstream edges 76 (relative to the advance of the article conveyor) located adjacent the transverse openings of each longitudinal surface 74 are sloped downwardly downstream of the conveyor advance. This can be seen, for example, in FIG. 14.

The partition inserting means 42 is illustrated in FIGS. 11–14 and is seen to include an elongated blade 80 mounted to rotate about a horizontal axis 82 extending transversely of the advance of the article conveyor and located downstream (relative to this article conveyor advance) of said blank saddle means 40. The partition inserting blade 80 includes a radial leading edge 84 which is approximately horizontal when it first engages the blank positioned on the blank saddle means 40 (FIG. 11). The leading edge 84 engages the partition blank located on the blank saddle generally along the medial cut and score lines 10 and 11 to fold the partition and force it through the transverse openings 66 and longitudinal openings 72. The blade 80 further has a circular circumferential edge 86 which generally merges with the radial leading edge 84 and which is located relative to the rotational axis 82 of the blade 80 to extend almost to the article conveyor (FIG. 14). The circumferential edge thereby extends into the article group as the article group is passing beneath the blank saddle 40 to push the partition, now completely folded, into the bottle group to the depth required. The blade 80 is rotated in timed relationship with the advance of the article conveyor so that the circumferential edge 86 preferably travels at the same speed as the article conveyor and, therefore, does not move relative to the partition being inserted into the group. The blade 80 further has a radial trailing edge 88 which merges generally with the circumferential edge 86 and which is relieved back towards the radial leading edge 84. This relieved trailing 88 minimizes the interference between the partition fully placed within the group of articles and the blade itself as the blade completes its rotation and is, therefore, withdrawn from the group of articles.

The blade 80 is shown in FIG. 14 in various positions in phantom lines, and the partition and bottle group corresponding to the blade position similarly are shown. The partition is guided by downwardly sloping edges 76 of the saddle support longitudinal surfaces 74 into the article group in a downward and downstream direction.

The blade 80 shown is symmetrical about its axis of rotation 82 so that each end of the blade operates on successive groups of articles passing beneath the saddle means.

What is claimed is:

1. An apparatus for folding and inserting a partition into a moving group of articles oriented in at least two three-article rows extending in line with the advance thereof on an article conveyor, the partition being die-cut from a blank having a central panel, pairs of inner and outer V-forming panels at the opposite edges, respectively of the central panel, end panels at the opposite edges, respectively, of the outer V-forming panels, and a medial score across the end and central panels and an aligned medial cut across the V-forming panels, the combination comprising:

(a) partition blank holding means;
(b) a blank conveyor movable from the blank holding means to the article conveyor;
(c) means for sequentially taking blanks from the blank holding means and depositing them flatwise onto the blank conveyor to be advanced thereon toward the article conveyor;
(d) means including spaced narrow plows extending along the blank conveyor generally over the V-forming panels for folding said V-forming panels downwardly below the central and end panels;
(e) blank saddle means spaced directly above the article conveyor with sufficient clearance to permit the passage of articles therebeneath and located in alignment with the blank conveyor;
(f) said blank saddle means including central and end supports in line, respectively, with the central and end panels, and said supports being separated from one another by transverse openings in line with the prefolded V-forming panels for receiving the same and by longitudinal openings in line vertically with and between the rows of articles, the transverse and longitudinal references being relative to the advance of the article conveyor;

(g) said blank saddle means supports including longitudinal surfaces converging downwardly to the longitudinal openings, and having the downstream edges (relative to the advance of the article conveyor) adjacent the transverse openings sloping downwardly downstream;

(h) partition inserting means mounted above the article conveyor in line vertically with and between the rows of articles operable upon a blank being positioned on the blank saddle means and in synchronized relationship with a group of articles passing therebeneath to engage the blank to fold and simultaneously force it through the longitudinal and transverse openings and into the article group;

(i) the partition inserting means including an elongated blade rotatable about a transverse axis downstream of said blank saddle means and having a radial leading edge to engage the partition blank generally along the medial scores and cuts, a circular circumferential edge merging with the leading edge and located to extend into the article group almost to the article conveyor and adapted to travel in synchronized velocity with the article conveyor, and a radial trailing edge merging with the circumferential edge and relieved back toward the leading edge; and (j) the advancing article group causing the partition blank to move downwardly downstream of the blank saddle means guided by the downstream edges of the longitudinal surfaces.

2. Apparatus for folding and inserting a partition into a moving group of articles oriented in at least two three-article rows extending in line with the advance thereof on an article conveyor, the partition being die-cut from a blank having a central panel, pairs of inner and outer V-forming panels at the opposite edges, respectively, of the central panel, end panels at the opposite edges, respectively, of the outer V-forming panels, and a medial score across the end and central panels and an aligned medial cut across the V-forming panels, the combination comprising:

(a) partition blank holding means;

(b) a blank conveyor movable from the blank holding means to the article conveyor;

(c) means for sequentially taking blanks from the blank holding means and depositing them flatwise onto the blank conveyor to be advanced thereon toward the article conveyor;

(d) means extending along the blank conveyor for folding said V-forming panels downwardly below the central and end panels;

(e) blank saddle means spaced directly above the article conveyor with sufficient clearance to permit the passage of articles therebeneath and located in alignment with the blank conveyor;

(f) said blank saddle means including central and end supports in line, respectively, with the central and end panels, and said supports being separated from one another by transverse openings in line with the prefolded V-forming panels for receiving the same and by longitudinal openings in line vertically with and between the rows of articles, the transverse and longitudinal references being relative to the advance of the article conveyor; and (g) partition inserting means mounted above the article conveyor in line vertically with and between the rows of articles operable upon a blank being positioned on the blank saddle means and in synchronized relationship with a group of articles passing therebeneath to engage the blank to fold and simultaneously force it through the longitudinal and transverse openings and into the article group.

3. Apparatus for forming and inserting a partition according to claim 2, wherein the partition insert means includes an elongated blade adapted to rotate about a transverse axis located downstream of said blank saddle means and having working edges adapted to engage the partition generally along the medial scores and cuts to push the partition into the article group, said blade moving in synchronized velocity with the article conveyor when disposed in the article group.

4. Apparatus for folding and inserting a partition according to claim 3, wherein the said working edges of the blade include a generally radial leading edge and a circular circumferential edge disposed to extend into the article group almost to the article conveyor.

5. Apparatus for folding and inserting a partition according to claim 4, wherein said working edge further includes a radial trailing edge merging with the circumferential and relieved back towards the leading edge.

6. Apparatus for folding and inserting a partition into a moving group of articles oriented in at least two three-article rows extending in line with the advance thereof on an article conveyor, the partition being die-cut from a blank having a central panel, pairs of inner and outer V-forming panels at the opposite edges, respectively, of the central panel, end panels at the opposite edges, respectively, of the outer V-forming panels, and a medial score across the end and central panels and an aligned medial cut across the V-forming panels, the combination comprising:

(a) blank saddle means spaced directly above the article conveyor with sufficient clearance to permit the passage of articles therebeneath;

(b) said blank saddle means including central and end supports for, respectively, the central and end panels, and said supports being separated from one another by transverse openings for receiving the V-forming panels folded in back-to-back relation and by longitudinal openings in line vertically with and between the rows of articles, the transverse and longitudinal references being relative to the advance of the article conveyor;

(c) said blank saddle means supports including longitudinal surfaces converging downwardly to the longitudinal openings; and (d) partition inserting means mounted above the article conveyor in line vertically with and between the rows of articles operable upon a blank being positioned on the blank saddle means and in synchronized relationship with a group of articles passing therebeneath to engage the blank to fold and simultaneously force it through the longitudinal and transverse openings and into the article group.

7. Apparatus for folding and inserting a partition according to claim 6, wherein the longitudinal surfaces of the blank saddle means supports have downstream edges (relative to the advance of the article conveyor) adjacent the transverse openings sloping downwardly downstream, and wherein the advancing article group causes the partition blank to move downwardly downstream of the blank saddle means guided by said downstream edges of the longitudinal surfaces.

8. Apparatus for folding and inserting a partition according to claim 6, wherein the partition inserting means includes an elongated blade rotatable about a transverse axis downstream (relative to the advance of the article conveyor) of said blank saddle means, and wherein said blade has a radial leading edge to engage the partition blank generally along the medial scores and cuts and a circular circumferential edge merging with the leading edge and located to extend into the article group almost to the article conveyor and adapted to travel in synchronized relationship with the article conveyor.

9. Apparatus for folding and inserting a partition according to claim 8, wherein said partition inserting means blade also has a radial trailing edge merging with the circumferential edge and relieved back toward the leading edge.

10. Apparatus for folding and inserting a partition into a moving group of articles oriented in at least two rows extending in line with the advance thereof on an article conveyor, the partition being die-cut from a blank having pairs of inner and outer V-forming panels and end panels at the opposite edges, respectively, of the outer V-forming panels, and a medial score across the end panels and an aligned medial cut across the V-forming panels, the combination comprising:
  (a) blank saddle means spaced directly above the article conveyor with sufficient clearance to permit the passage of articles therebeneath;
  (b) said blank saddle means including end supports for the end panels that are separated from one another by transverse openings for receiving the V-forming panels folded in back-to-back relationship to one another and by longitudinal openings in line vertically with and between the rows of articles, the transverse and longitudinal references being relative to the advance of the article conveyor;
  (c) said blank saddle means supports including longitudinal surfaces converging downwardly to the longitudinal openings, and having the downstream edges (relative to the advance of the article conveyor) adjacent the transverse openings sloping downwardly downstream;
  (d) partition inserting means mounted above the article conveyor in line vertically with and between the rows of articles operable upon a blank being positioned on the blank saddle means and in synchronized relationship with a group of articles passing therebeneath to engage the blank to fold and simultaneously force it through the longitutdinal and transverse openings and into the article group;
  (e) the partition inserting means including an elongated blade rotatable about a transverse axis downstream of said blank saddle means and having a radial leading edge to engage the partition blank generally along the medial scores and cuts and a circular circumferential edge merging with the leading edge and located to extend into the article group almost to the article conveyor and adapted to travel in synchronized velocity with the article conveyor; and
  (f) the advancing article group causing the partition blank to move downwardly downstream of the blank saddle means guided by the downstream edges of the longitudinal surfaces.

References Cited
UNITED STATES PATENTS

| | | | |
|---|---|---|---|
| 3,031,813 | 5/1962 | Ganz | 53—48 X |
| 3,350,836 | 11/1967 | Dillon et al. | 53—128 X |
| 3,381,452 | 5/1968 | Gentry et al. | 53—393 |

THERON E. CONDON, Primary Examiner

R. L. SPRUILL, Assistant Examiner

U.S. Cl. X.R.
53—157; 93—37